United States Patent [19]

Slaughter

[11] 4,076,376
[45] Feb. 28, 1978

[54] OPTICAL TRANSMISSION SYSTEMS
[75] Inventor: Raymond Jeffrey Slaughter, Chislehurst, England
[73] Assignee: BICC Limited, London, England
[21] Appl. No.: 654,524
[22] Filed: Feb. 2, 1976

Related U.S. Application Data
[63] Continuation of Ser. No. 514,395, Oct. 15, 1974, abandoned.

[30] Foreign Application Priority Data
Oct. 16, 1973 United Kingdom ..................48096

[51] Int. Cl.² ........................................... G02B 5/14
[52] U.S. Cl. ................................................ 350/96.21
[58] Field of Search ............................ 350/96 C, 96 R; 339/89 R

[56] References Cited
U.S. PATENT DOCUMENTS

| | | | |
|---|---|---|---|
| 3,043,910 | 7/1962 | Hicks, Jr. ................. | 350/96 B |
| 3,402,381 | 9/1968 | Gaw et al. ................. | 339/89 R |
| 3,504,984 | 4/1970 | Bush ......................... | 350/96 C |
| 3,775,828 | 12/1973 | Kopen Haver ............ | 339/89 R |
| 3,803,409 | 4/1974 | Prochazka ................. | 350/96 C |
| 3,834,391 | 9/1974 | Block ........................ | 350/96 C |
| 3,867,697 | 2/1975 | Vanzetti et al. ........... | 50/96 C X |
| 3,880,452 | 4/1975 | Fields ....................... | 350/96 C X |

FOREIGN PATENT DOCUMENTS

| | | | |
|---|---|---|---|
| 1,017,354 | 1/1966 | United Kingdom ....... | 350/96 C |

OTHER PUBLICATIONS

C. A. Parfitt, B. Ellis, "Interconnections and Switches for Glassfibre Optical Links" Electronic Components, Jan. 28, 1972, pp. 72-75.

*Primary Examiner*—John K. Corbin
*Assistant Examiner*—Rolf Hille
*Attorney, Agent, or Firm*—Buell, Blenko & Ziesenheim

[57] ABSTRACT

In an optical transmission system in which light being transmitted from a light-emitting device to a detector device is caused to travel along at least one path built up of at least two optical fibers connected end-to-end, the optical fibre of the interconnected fibres that is nearer the light-emitting device being of smaller cross-sectional area than the other optical fibre, the optical fibres are detachably connected end-to-end by means of a connector comprising two separately formed bodies. One body of the connector has a bore in which one of said two optical fibres is housed and from which a length of said optical fibre protrudes and the other body of the connector has a through-bore which is stepped between its ends and in one part of which the other of said two optical fibres is housed. The two bodies of the connector are connected together with the length of the fibre protruding from said one part of the connector fitting in the vacant part of the stepped through-bore of the other body of the connector in such a way that the end faces are in contact or close proximity to one another and that the end face of the fibre having the larger cross-sectional area overlies at least a major portion, and preferably substantially the whole, of the end face of the other fibre.

6 Claims, 2 Drawing Figures

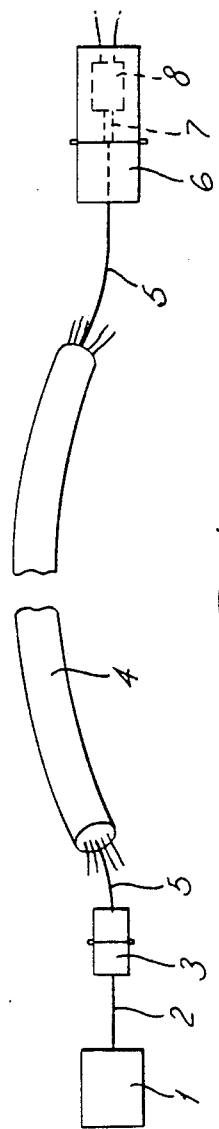
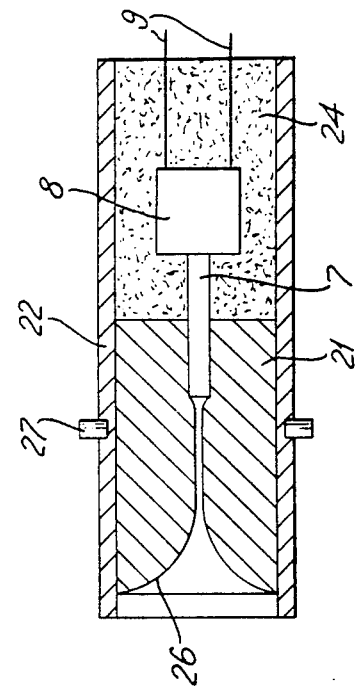
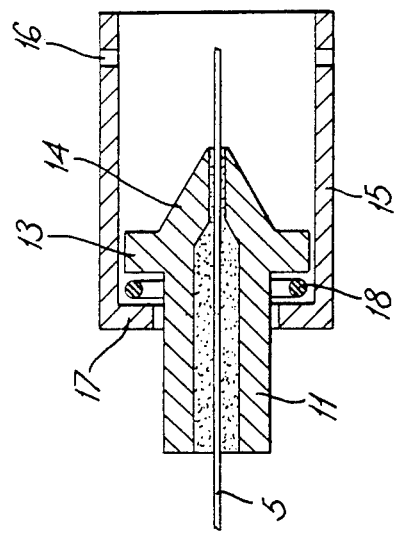
Fig.1.
Fig.2.

OPTICAL TRANSMISSION SYSTEMS

This is a continuation of application Ser. No. 514,395, filed Oct. 15, 1974, now abandoned.

This invention relates to optical transmission systems for the transmission of the ultra-violet, visible and infra-red regions of the electromagnetic spectrum, which regions, for convenience, will hereinafter be included in the generic term "light", and especially, but not exclusively, to optical transmission systems for use in the telecommunications field adapted for transmission of light having a wave-length within the range 0.8 to 1.1 micrometers.

The invention is particularly concerned with optical transmission systems in which light being transmitted from a light-emitting device to a detector device is caused to travel along at least one path built up of at least two optical fibres connected end-to-end. Each optical fibre of the system may be of a single transparent material, the refractive index of which may gradually decrease in a direction towards the outer surface of the fibre over at least a part of the distance between the central axis of the fibre and its outer surface, or each optical fibre may be of composite form comprising a core of transparent material clad throughout its length with another transparent material of lower refractive index which, by total internal reflection of light being transmitted along the fibre, confines at least a major proportion of the light within the core. A composite optical fibre is generally, but not necessarily, made of two glasses of different refractive indices, the glass forming the core having a higher refractive index than the glass forming the cladding; the refractive index of the glass of the core may gradually decrease in a direction towards the outer surface of the core over at least a part of the distance between the central axis of the core and its outer surface. In an alternative form of composite fibre the core may be made of a transparent liquid having a higher refraction index than that of the cladding. Each optical fibre of the system is generally, but not necessarily, of a circular cross-section.

According to the present invention in an optical transmission system in which light being transmitted from a light-emitting device to a detector device is caused to travel along at least one path built up of at least two optical fibres connected end-to-end, the optical fibre of the interconnected fibres that is nearer the light-emitting device being of smaller cross-sectional area than the other optical fibre, wherein the optical fibres are detachably connected end-to-end by means of a connector comprising two separately formed bodies, one body of the connector having a bore in which one of said two optical fibres is housed and from which a length of said optical fibre protrudes and the other body of the connector having a throughbore which is stepped between its ends and in one part of which the other of said two optical fibres is housed, the two bodies of the connector being connected together with the length of the fibre protruding from said one part of the connector fitting in the vacant part of the stepped throughbore of the other body of the connector in such a way that, at the adjacent end faces of the optical fibres, the end face of the fibre having the larger cross-sectional area overlies at least a major portion, and preferably substantially the whole, of the end face of the other fibre.

Where each of the two optical fibres is of composite form comprising a core of transparent material clad throughout its length with another transparent material of lower refractive index, preferably the end face of the core of the composite fibre having the larger cross-sectional area overlies at least a major portion, and preferably substantially the whole, of the end face of the core of the other composite fibre.

The adjacent end faces of the two optical fibres need not be in physical contact, provided that the end faces are not spaced so far apart that a major proportion of the light leaving the end face of the optical fibre, or of the core of the composite fibre, of smaller cross-sectional area will pass outside of the peripheral edge of the end face of the optical fibre, or of the core of the composite fibre, of larger cross-sectional area. Thus, in the system of the present invention, a transverse offset of a limited extent between the two optical fibres and/or a gap of limited length between adjacent end faces of the two optical fibres is or are permissible without substantial loss of light-transfer efficiency in the connection between the two optical fibres.

The invention also includes an optical fibre connector for use in an optical transmission system comprising two separately formed bodies, one body of the connector having a bore for housing one of two optical fibres to be detachably connected end-to-end and the other body of the connector having a throughbore which is stepped between its ends, the part of said stepped throughbore that will be nearer said first body when the two bodies are detachably connected together being of the same cross-sectional shape and size as the bore of the said first body.

Preferably the part of the stepped throughbore of said second body of the connector that is of the same cross-sectional shape and size as the bore of said first body of the connector is of smaller cross-sectional area than the other part of said stepped throughbore.

The optical fibre connector may be in accordance with the invention described in U.S. specification Ser. No. 524,240 filed Nov. 15, 1974 now U.S. Pat. No. 3,948,582 in that one of two adjacent bodies of the connector has an end of such a configuration having regard to the configuration of an end of the other of said adjacent bodies that as the two bodies are caused to move axially towards one another an optical fibre carried by the or each body is constrained to lie in substantially axial alignment with and to enter the bore of the other of the two bodies and that when the two bodies carrying an optical fibre are substantially fully inter-engaged, the neighbouring end faces of the optical fibres abut or are closely spaced apart.

The invention is further illustrated by a description, by way of example, of an optical transmission system in which light from a light-emitting device is transmitted along an optical path to a detector, and of a preferred two-part optical fibre connector used in the transmission system with reference to the accompanying drawing, in which:

FIG. 1 is a diagrammatic representation of the optical transmission system, and

FIG. 2 is a cross-sectional side view of the preferred two-part connector drawn on an enlarged scale.

In the optical transmission system shown in FIG. 1, the light-emitting device 1 has an optical fibre lead 2 and the free end of the lead is connected by a plug and socket connector 3 to an optical fibre 5 of an optical cable 4. The other end of the fibre 5 of the optical cable is connected by a plug and socket connector 6 to the free end of an optical fibre lead 7 of the detector 8, this lead having a diameter greater than that of the fibre 5.

The two-part optical fibre connector shown in FIG. 2 is the form of connector 6 used to connect the fibre 5 of the optical cable 4 to the optical fibre lead 7 of the detector 8 of the transmission system shown in FIG. 1. The connector 6 comprises a body 11 and a body 21. The body 11 has an axial bore in which is cemented one end of the optical fibre 5 of the optical cable 4. The body 11 is of circular external cross-section and has, between its ends, a radially extending flange 13. At one end of the body 11 the external diameter of the body decreases smoothly to form a conical plug 14, the optical fibre 5 protruding a predetermined distance from the body at that end. Freely rotatably mounted on the body 11 is a sleeve 15 which has a pair of diametrically opposed L-shaped slots 16 opening into one end of the sleeve. The other end of the sleeve 15 has a radially inwardly extending flange 17. A washer 18 of compressible material is provided between the flange 16 and the flange 13.

The body 21 is mounted in part of the bore of a tubular casing 22, the other part of the bore housing the detector 8 which is encapsulated in resin 24 with its terminal leads 9 protruding from the housing. The body 21 has a stepped axial bore and in the part of the bore of larger diameter is housed the fibre lead 7 of the detector 8. The diameter of the part of the bore of the body 21 of smaller diameter gradually increases in a direction away from the detector 8 to form a flared socket 26. The casing 22 carries a pair of lugs 27 for engaging in the L-shaped slots 16 of the sleeve 15.

When the two bodies 11, 21 are to be connected together the conical plug 14 is introduced into the flared socket 26 and the sleeve 15 is urged axially so that the lugs 27 engage in the L-shaped slots 16 and the washer 18 is compressed. The optical fibres 5 and 7 are constrained to lie in substantially axial alignment with the end face of the fibre 7 overlying substantially the whole of the end face of the fibre 5 and when the flange 13 abuts the end face of the casing 22 the bodies 11, 21 are fully engaged with the end faces of the optical fibres abutting. The sleeve 15 is then rotated with respect to the casing 22 to lock the bodies 11, 21 together.

An additional advantage may be gained by making the numerical aperture of the optical fibre lead of the detector significantly greater than that of the optical fibre of the cable to which it is connected. This raises the acceptance angle of the optical fibre lead and thus permits a slight tilt of the connection between the two fibres, in addition to the transverse offset and axial gap permitted by the difference in diameter of the fibres.

What I claim as my invention is:

1. For use in an optical transmission system, an optical fibre connector comprising two separately formed bodies, one body of the connector having a bore for housing one of two optical fibres to be detachably connected end-to-end and the other body of the connector having a throughbore which is stepped between its ends the part of said stepped throughbore that will be nearer said first body when the two bodies are detachably connected together being of the same cross-sectional shape and size as the bore of said first body.

2. An optical fibre connector as claimed in claim 1, wherein the part of the stepped throughbore of said second body of the connector that is of the same cross-sectional shape and size as the bore of said first body of the connector is of smaller cross-sectional area than the other part of said stepped throughbore.

3. An optical transmission system in which light being transmitted from a light-emitting device to a detector device is caused to travel along at least one path built up of at least two optical fibres connected end-to-end, the optical fibre of the interconnected fibres that is nearer the light-emitting device being of smaller cross-sectional area than the other optical fibre wherein the optical fibres are detachably connected end-to-end by means of a connector comprising two separately formed bodies, one body of the connector having a bore in which one of said two optical fibres is housed and from which a length of said optical fibre protrudes and the other body of the connector having a throughbore which is stepped between its ends and in one part of which the other of said two optical fibres is housed, the two bodies of the connector being connected together with the length of the fibre protruding from said one part of the connector fitting in the vacant part of the stepped throughbore of the other body of the connector in such a way that, at the adjacent end faces of the optical fibres, the end face of the fibre having the larger cross-sectional area overlies at least a major portion of the end face of the other fibre providing a light transmitting connection.

4. An optical transmission system as claimed in claim 3, wherein the optical fibre with the end face of larger cross-sectional area is housed in one part of the stepped throughbore of said one body of the connector.

5. An optical transmission system as claimed in claim 3, wherein the end face of the optical fibre having the larger cross-sectional area overlies substantially the whole of the end face of the other optical fibre.

6. An optical transmission system as claimed in claim 3, wherein the optical fibres are so connected that there is a gap between their adjacent end faces which is of such a length that there is no substantial loss of light-transfer efficiency in the connection between the two fibres.

* * * * *